Aug. 17, 1926.
A. M. YOCOM
1,596,475
BRAKE MECHANISM
Filed August 8, 1924
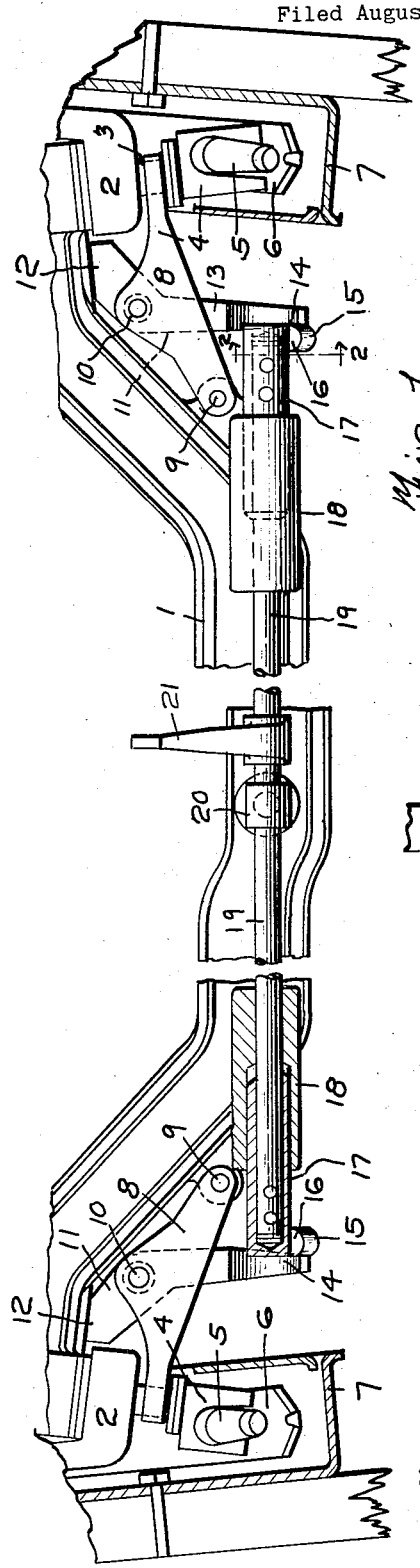
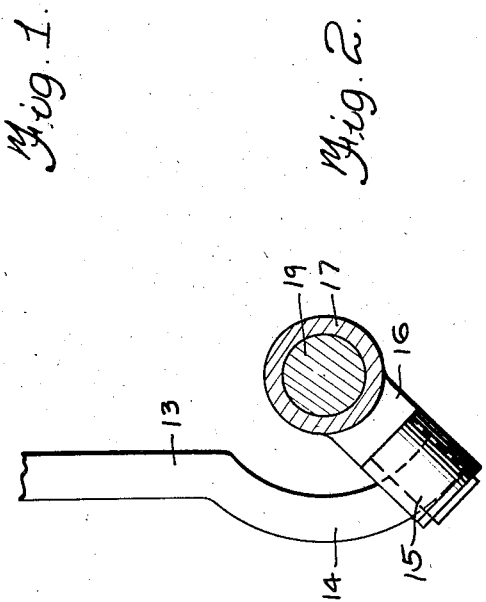
Inventor
Alvin M. Yocom
By Howard A. Coombe
Attorney

UNITED STATES PATENT OFFICE.

ALVIN M. YOCOM, OF POTTSTOWN, PENNSYLVANIA, ASSIGNOR TO U. S. AXLE COMPANY, OF POTTSTOWN, PENNSYLVANIA, A CORPORATION OF DELAWARE.

BRAKE MECHANISM.

Application filed August 8, 1924. Serial No. 730,946.

This invention relates to brake-actuating mechanism, designed especially for use in the front or steering wheels of motor vehicles. It is a modification or improvement upon the mechanism disclosed in my Patent No. 1,507,100, issued Sept. 2, 1924.

The improvement is illustrated in the accompanying drawing, in which,

Fig. 1 is a rear view of the front axle of a motor vehicle, equipped with the present improvement, and Fig. 2 is a detail end view of a part of the mechanism.

The axle 1, is upwardly inclined at its ends and supports the steering knuckles 2, in the usual way by means of pins, in which are slidably and rotatably mounted the stems 3, of the yoke members 4, which straddle the toggle-links 5, for expanding the shoes 6, in the brake drums 7, all as shown and described in my patent aforesaid.

Each yoke member 4, is depressed to apply the brakes by the bifurcated end of the lever 8, pivoted at 9 on the axle 1. On said lever 8 is pivoted, at 10, a cam lever 11, the end 12 of which bears on the under side of the axle, while its other end, 13, has an inclined or skew cam surface, 14, on its inner face, said end 13 and cam surface being curved in the form of an arc of a circle, as shown in Fig. 2. Cooperating with said surface, is a roller 15, carried on an arm 16, fast on a fitting 17, slidably and rotatably mounted in a bearing 18, formed on the axle 1.

A rod 19 is slidably and rotatably mounted on the axle, as in a bearing 20, and has its ends riveted in the fittings 17, while, at an intermediate point in its length, it has secured to it the brake lever 21, by which it is connected to the brake pedal, not shown. When the pedal is depressed, the rod 19 is turned, and the arms 16, on the ends of the rod, are swung, carrying their rollers 15 upwardly over the skew cam surfaces 14, whereby the cam levers 11 are swung and their cam ends 12 rock on the axle, lowering their pivots 10 and the free ends of the levers 8, thereby depressing the yoke members 4 and actuating the toggle links 5, to expand the brake shoes 6, in the drums 7.

Should the brake in the drum of one of the wheels come into contact first, the rod 19 will move longitudinally towards the other wheel, whereby the application of both brakes is perfectly equalized. The same mechanism may be used in the rear wheels, if desired, although, of course, it is more especially adapted to, and useful in connection with, the front or steering wheels.

By means of the mechanism described, the braking is in no way affected by the steering movement of the wheels; the brakes are applied with absolutely equal pressure, and the multiplication of the power is great, owing to the lever and cam transmission.

Having thus described my invention, what I claim is:

1. In an automobile brake mechanism in which the brakes are applied by means slidable in the ends of the axle and in which said members are actuated by levers pivoted on the axle, the combination of cams pivoted on said levers, one end of each cam bearing against the axle and the other end having an inner skew face; a rod extending longitudinally of the axle and mounted to turn and slide thereon, arms on the ends of said rod engaging said skew faces, and means to turn said rod.

2. In the mechanism of claim 1, the skew faces being formed on an arc-shaped portion of the cams.

3. An equalizing brake mechanism for the steering wheels of automobiles, comprising the combination with the inclined knuckle pins, of a yoke member slidable therein and having a shoulder, a lever pivoted on the axle adjacent each end thereof and having its free end bearing on said shoulder, a cam pivoted on each lever to rock on the axle and having a depending arm provided with a skew cam face, a rod slidably and rotatably mounted on the axle and secured at each end to a sleeve, an arm on each sleeve carrying a roller adapted to act on said skew cam face to rock the cam and thereby depress said lever to actuate the brake, and means to turn said rod.

Signed this 1st day of June, 1925.

ALVIN M. YOCOM.